W. M. RYAN & J. E. CANDLIN.
POULTRY CAR.
APPLICATION FILED JULY 17, 1908.

No. 910,865. Patented Jan. 26, 1909.
3 SHEETS—SHEET 2.

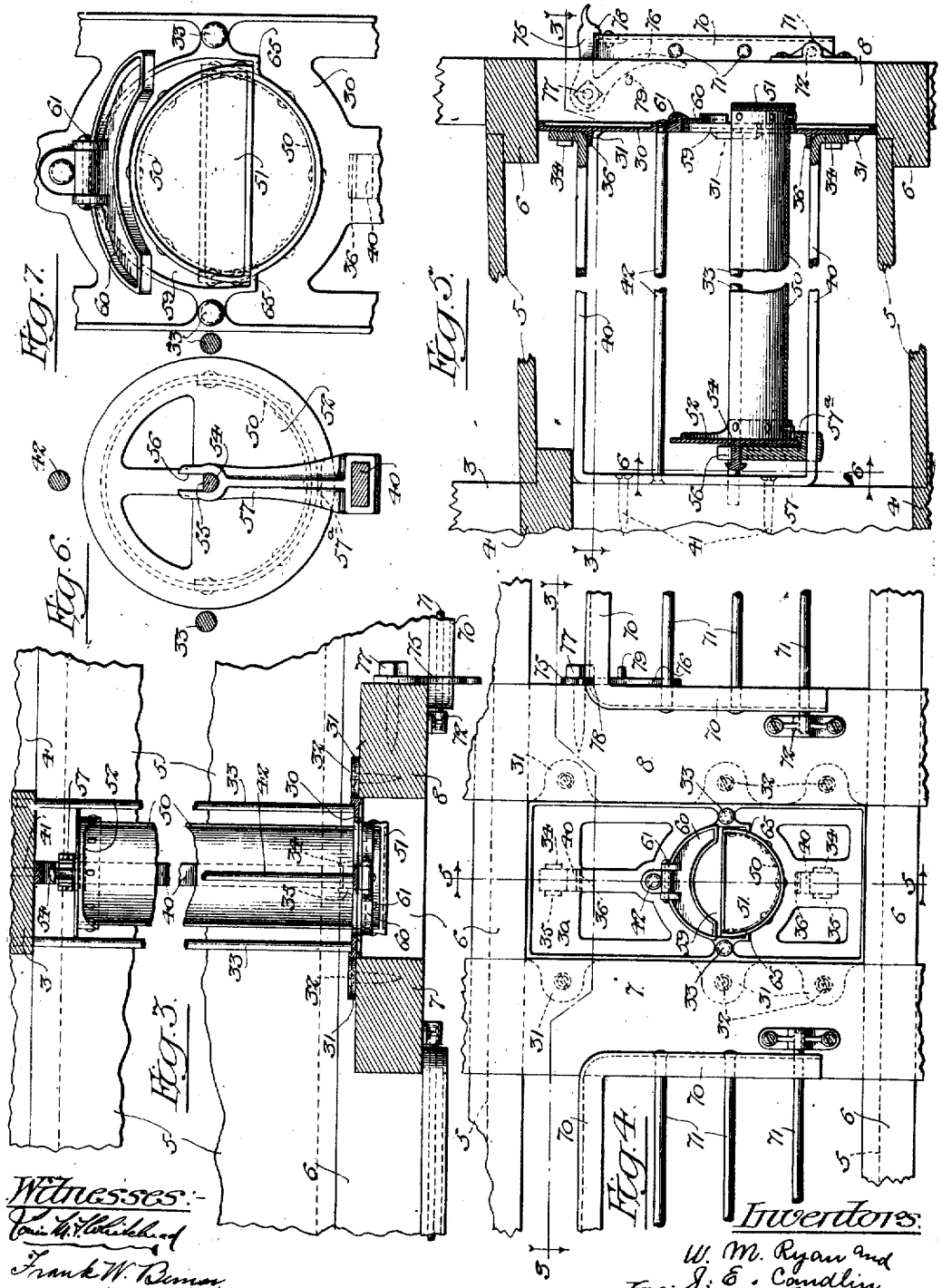

UNITED STATES PATENT OFFICE.

WILLIAM M. RYAN AND JAMES EDWARD CANDLIN, OF CHICAGO, ILLINOIS, ASSIGNORS TO RYAN CAR COMPANY, OF CHICAGO, ILLINOIS, A CORPORATION OF MAINE.

POULTRY-CAR.

No. 910,865.    Specification of Letters Patent.    Patented Jan. 26, 1909.

Application filed July 17, 1908. Serial No. 443,988.

*To all whom it may concern:*

Be it known that we, WILLIAM M. RYAN and JAMES EDWARD CANDLIN, citizens of the United States, and residents of Chicago, in the county of Cook and State of Illinois, have invented certain new and useful Improvements in Poultry-Cars, of which we do declare the following to be a full, clear, and exact description, reference being had to the accompanying drawings, forming part of this specification.

The present invention has for its object to provide an improved construction of railway car whereby live poultry may be safely and conveniently transported and the invention consists in the features of novelty hereinafter described, illustrated in the accompanying drawings and particularly pointed out in the claims at the end of this specification.

Figure 1:
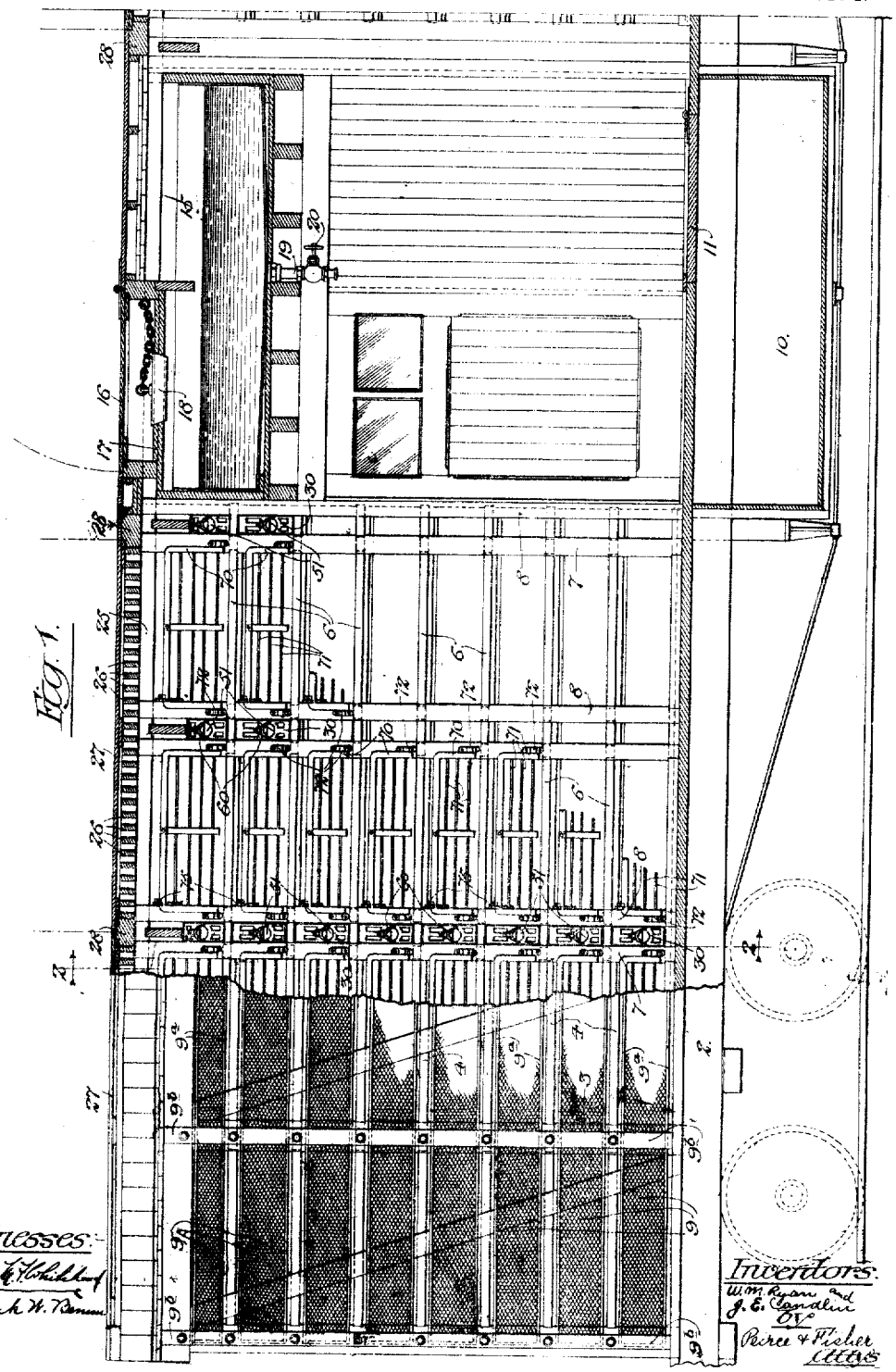
Figure 2:
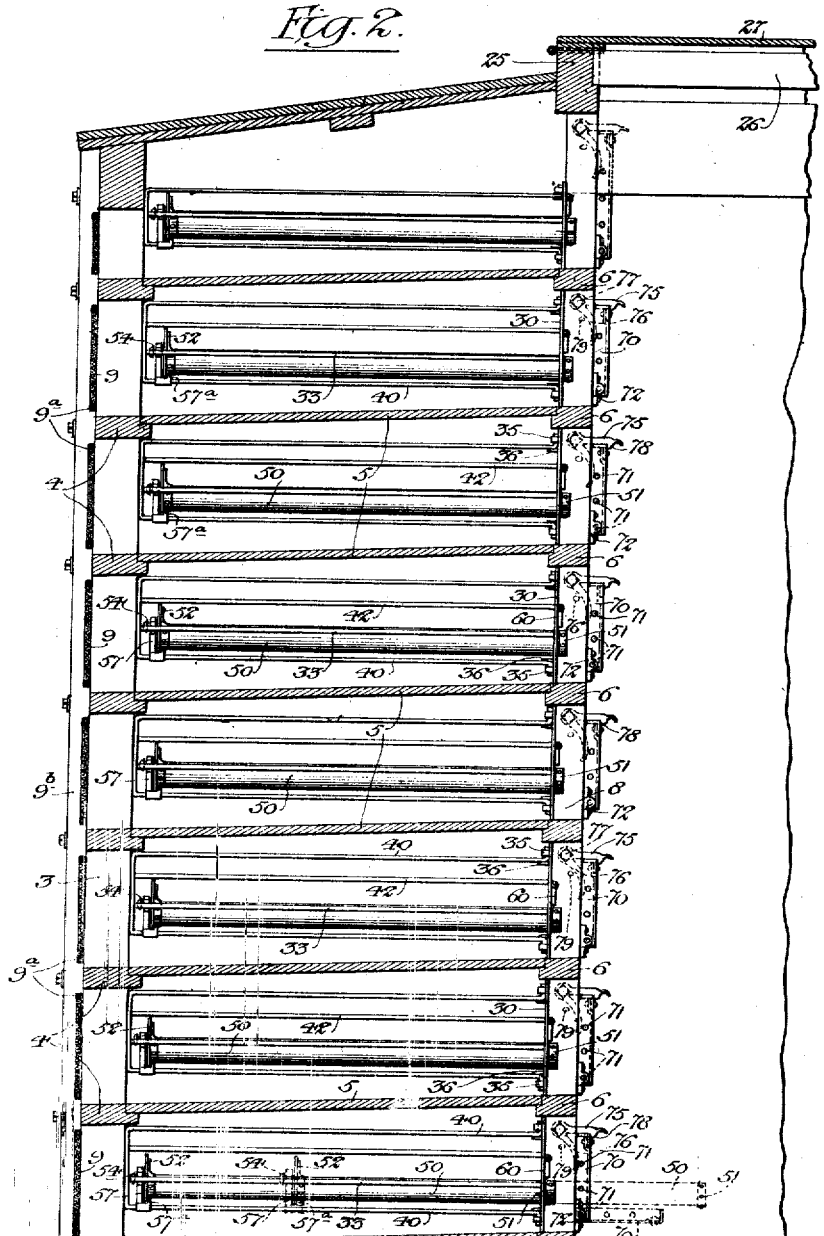

Figure 1 is a view partly in side elevation and partly in central longitudinal section through a poultry car embodying our invention. Fig. 2 is a view in vertical cross section on line 2—2 of Fig. 1, showing one half of the car upon an enlarged scale. Fig. 3 is an enlarged detail view in horizontal section on line 3—3 of Fig. 4 through the standards that support the troughs, the trough being shown in plan. Fig. 4 is a detail view in front elevation of the parts illustrated in Fig. 3. Fig. 5 is a view in vertical longitudinal section on line 5—5 of Fig 4. Fig. 6 is a view in vertical section on line 6—6 of Fig. 5, looking in the direction of the arrow. Fig. 7 is a front view of the end of one of the feed troughs and adjacent parts, the trough being shown in inverted position.

Our invention is shown as applied to that type of poultry cars in which compartments for receiving the poultry are arranged in tiers upon opposite sides of a center aisle that extends from end to end of the car. From the outer, bottom sills 2 of the car rise the vertical posts 3 between which extend the cross bars 4 that support the outer portions of the floors 5 of the several compartments. The inner ends of the floors 5 are supported by transverse bars 6 that are secured between upright posts 7 and 8 that extend from bottom to top of the car, these posts 7 and 8 being arranged at a distance apart, as clearly shown in Figs. 1 and 3 of the drawings. The inner edges of the cross bars 4 and 6 are rabbeted to receive the corresponding edges of the floors 5. The outer ends of the compartments are closed by screens consisting preferably of wire mesh 9 secured to angle bars 9ª that extend across several compartments, these screens being held in position by cleats 9ᵇ that are bolted to the front upright posts 3 of the car, as clearly shown in Figs. 1 and 2 of the drawings.

As shown in Fig. 1, the central portion of the car is provided with doors upon its opposite sides, and this portion of the car is free from compartments. Beneath the floor of this central portion of the car is secured a bin 10 to receive corn or other suitable grain for the poultry, a hinged door 11 being formed in the car floor to permit access to the bin. Above the central portion of the car and sustained by suitable cross beams is a tank 15 adapted to receive water to be supplied to the several feed troughs of the compartments and over the top of this tank 15, or a portion thereof, extends a hinged trap door 16 and beneath it a transverse wall 17 in which is formed an opening for the admission of water, this opening being normally closed by a plug 18 A short pipe 19 extends from the bottom of the tank 15, this pipe being furnished with a valve 20 to control the flow of water from the tank. Across the top of the center aisle of the car, and supported by longitudinal beams 25, extends a series of slats 26 that are separated a sufficient distance apart to permit a free circulation of air therethrough and over the slats 26 and hinged to the beams 25 are doors 27 that form the central portion of the car roof. When the doors 27 are raised, a freer circulation of air through the car is effected. As clearly seen in Fig. 1 of the drawings, the adjacent edges of the doors 27 rest upon the upper portions of the transverse joists or beams 28.

Between each pair of inner standards 7 and 8 and secured to the inner face thereof, are mounted the castings 30 (see Fig. 3 of the drawings), these castings being preferably formed with lugs 31 that are secured as at 32 to the inner faces of the standards 7 and 8. Between the castings 30 and the outer upright posts or standards 3 extend iron rods 33, the ends of these rods being secured respectively to the castings and to the upright posts or standards 3 (see Fig. 3). Upon the inner face of each of the castings 30 are two sets of lugs 34, 35 and 36 and between the lugs 34 and 35 and bearing upon the lugs 36 adjacent the top and bottom of each casting 30 are the bent ends of a U-shaped frame or bar 40 that extends from the casting 30 to the upright post or standard 3 at the opposite end of the compartment. This frame or bar 40 is preferably secured to the upright post or standard 3 by screws 41, as clearly shown in Fig. 5 of the drawings. To the outer, vertical portion of the frame or bar 40 is secured the end of a rod 42, the inner end of this rod being secured to the casting 30. The frame or bar 40, the rod 42 and the rods 33 prevent the poultry passing from one compartment to another, or from entering or roosting over the feed troughs.

Each of the feed troughs is shown as formed of a semi-cylindrical sheet metal body 50 that is attached to an inner cast metal end 51 and an outer cast metal end 52, the inner and outer castings that form the ends of the trough being preferably riveted to the body portion of the trough, as clearly seen in Fig. 5 of the drawings. The outer end casting 52 of each feed trough is shown as provided with an outwardly projecting trunnion 54 having a headed end, this trunnion setting within a socket 56 at the top of a standard 57. By reference to Fig. 6 it will be seen that each trunnion 54 is formed with a flattened portion 55, so that when it is desired to withdraw the trunnion from its standard 57, the trough may be turned a quarter of a revolution, the flattened or cutaway portion 55 of the trunnion then permitting the trunnion to be lifted through the upper, narrow part of the socket 56. The lower end of the standard 57 is formed with an opening through which passes the lower member of the frame or bar 40, the standard being free to slide upon its frame or bar.

The standard 57 is formed adjacent its bottom with a vertical flange 57ª forming a slot to receive the projecting edge of the circular casting 52, as clearly shown in Figs. 5 and 6, so that as the trough is drawn inwardly towards the center of the car, the standard 57 will slide with it upon the lower member of the bar 40.

Each of the castings 30 is formed with a central opening 59 through which the inner end of the corresponding feed trough projects and above the upper portion of this opening 59 a latch plate 60 is pivoted as at 61 to a lug formed on the outer face of the casting 30. The purpose of the latch plate 60 is to coöperate in holding the feed trough in normal, upright position, as shown in Figs. 3, 4 and 5 of the drawings, since, when the latch plate depends above the outer end of the trough, the turning of the trough upon its trunnion 54 is prevented.

By reference more particularly to Fig. 7 of the drawings, it will be seen that at the sides of the opening 59 in each casting 30 there are formed the shoulders or ledges 65 that serve to sustain the outer portion of the feed trough when the trough, in order to empty it, has been turned to inverted position, as shown in Fig. 7.

From the foregoing description, it will be seen that when a feed trough is in position for use, as illustrated in Figs. 3, 4, 5 and 6, and in dotted lines in Fig. 7, its inner end portion will rest upon the lower curved portion of the opening 59 of the corresponding casting 30 and the latch plate or keeper 60 will serve to prevent the accidental turning of the trough. When, however, it is desired to invert the trough in order to discharge its contents, the latch plate or keeper 60 will be raised and the trough may then be turned by hand, to the position shown in full lines in Fig. 7, and, being moved outward slightly, its inverted upper edge of the casting 51 will rest upon the ledges or supports 65 at the sides of the opening 59 of the casting 30.

The inner end of each compartment for poultry is normally closed by a gate consisting preferably of a U-shaped angle bar or frame 70, to the sides of which are secured the ends of the transverse bars 71. The lowermost of these transverse bars 71 has its ends extended, as clearly shown in Fig. 4, to project through the ends of the angle bars 70 and within bearing plates 72 that are secured to the faces of the uprights 7 and 8. Above each of these gates is a latch to retain the gate in upright, closed position. This latch consists of an upper member 75 and a lower member 76, preferably formed as an integral casting, that is pivoted as at 77 to the side of one of the uprights 8. The member 75 of the latch has a downwardly extending lug 78 adapted to engage the upper edge of the gate and hold the same against accidental displacement. The member 76 of the latch projects downwardly into position to be struck by one of the cross bars 71 of the gate. The weight of the latch serves to hold it normally in closed position, shown in Fig. 5, and any jarring of the latch that would tend to disengage its upper member 75 from the top of the gate is resisted by the lower member 76 contacting with the cross rods 71 of the gate. When it is desired, however, to open the gate, the attendant may raise the latch so as to permit the gate to swing downwardly. Any suitable form of stop, as, for example, a pin 79, projecting from one of the upright bars 8, may be employed to limit the downward movement of the latch. When the gate is turned from the open to the closed position, its upper edge will strike against the beveled front face of the lug 78, thereby slightly lifting the latch until the gate passes behind the lug. At such time, the lower portion of the member 76 of the latch will be in close proximity to one of the bars 71 of the gate.

It is obvious that numerous changes may be made in the details set forth without departure from the essentials of the invention.

Having thus described our invention, what we claim as new, and desire to secure by Letters Patent, is:—

1. A poultry car, comprising compartments arranged side by side, troughs extending longitudinally of and between said compartments, a sliding support for the outer end of each trough, a support for the inner end of each trough having an opening through which said end of the trough projects, and means extending longitudinally between the compartments whereon the support for the inner end of the trough is slidably mounted.

2. A poultry car, comprising compartments arranged side by side, troughs extending longitudinally of and between said compartments, a sliding support for one end of each trough and whereon said trough is pivotally mounted, and means for sustaining the opposite end of said trough in manner permitting it to be inverted.

3. A poultry car, comprising compartments arranged side by side, troughs extending longitudinally of and between said compartments, a sliding support for one end of each trough and whereon said trough is pivotally mounted, said support and said trough being detachably interlocked, a bar whereon said sliding support is sustained and a support at the inner end of each trough provided with an opening through which said inner end of the trough projects.

4. A poultry car, comprising compartments arranged side by side, vertical posts at the inner ends of said compartments, troughs extending longitudinally of and between said compartments, supports arranged between said vertical posts for sustaining the inner ends of the troughs and sliding supports for the outer ends of the troughs and whereon said troughs are pivotally mounted.

5. A poultry car, comprising compartments arranged side by side, troughs extending longitudinally of and between said compartments, vertical posts at the inner ends of said compartments, castings mounted between said vertical posts, having openings to receive the inner ends of the troughs, latch plates or keepers pivoted to said castings to engage said troughs and sliding supports to which the outer ends of the troughs are pivotally connected.

6. A poultry car, comprising compartments arranged side by side, troughs extending longitudinally of and between said compartments, sliding supports for the outer ends of said troughs, said supports having open seats or sockets, pivot pins projecting from the outer ends of the troughs and within said seats or sockets, said pivot pins being cut-away to permit the troughs to be detached from said supports and means at the inner ends of said troughs for pivotally sustaining the troughs.

7. A poultry car, comprising compartments arranged sde by side, troughs extending longitudinally of and between said compartments, a support for the outer end of each trough and whereon it is pivotally mounted, vertical posts at the inner ends of said compartments, castings arranged between said vertical posts and having openings through which the inner ends of the troughs project, said castings being provided with ledges or supports for sustaining the troughs in inverted position.

8. A poultry car, comprising compartments arranged side by side, troughs extending longitudinally of and between said compartments, vertical posts at the inner ends of said compartments arranged at a slight distance apart, supports extending between and secured to said vertical posts and having openings through which the troughs may project and having shoulders or ledges to sustain the troughs in inverted position, bars arranged above and below said troughs between the compartments, and supports for the inner end of said troughs and whereon they are pivotally mounted.

9. A poultry car, comprising compartments arranged side by side, an outer vertical post arranged centrally between each pair of compartments, a pair of inner vertical posts arranged at a slight distance apart at the inner ends of each pair of compartments, supports extending between the pairs of inner, vertical posts and having openings therein through which the troughs may project, troughs extending longitudinally of and between said compartments, supports at the inner ends of said troughs and whereon they are pivotally mounted, and bars extending between said compartments and having their outer ends secured to the outer posts and their inner ends secured to the said supports.

WILLIAM M. RYAN.
J. EDWARD CANDLIN.

Witnesses:
LILLIAN E. DOE,
CHARLES S. ORNE.